Sept. 22, 1964 J. W. WITHERS ETAL 3,149,463
VARIABLE SPREAD FUEL DISPERSAL SYSTEM
Filed May 21, 1962 2 Sheets-Sheet 1

Inventors
John William Withers
Rodney Alan Rowe
By
Bailey, Stephen, Huettig
Attorneys Sept. 22, 1964   J. W. WITHERS ETAL   3,149,463
VARIABLE SPREAD FUEL DISPERSAL SYSTEM Filed May 21, 1962   2 Sheets-Sheet 2

Inventors
John William Withers
Rodney Alan Rowe
By
Bailey, Stephens Huetig
Attorneys

United States Patent Office 3,149,463
Patented Sept. 22, 1964

3,149,463
VARIABLE SPREAD FUEL DISPERSAL SYSTEM
John William Withers and Rodney Alan Rowe, Filton, Bristol, England, assignors to Bristol Siddeley Engines Limited, Bristol, England, a British company
Filed May 21, 1962, Ser. No. 196,104
Claims priority, application Great Britain, June 1, 1961, 19,818/61
7 Claims. (Cl. 60—39.74)

The invention relates to a method and apparatus for effecting variable spread dispersal of one fluid into another. Both fluids may be gases or liquids or one may be a gas and the other a liquid. The invention may be applied for example to the controlled mixing of substances in chemical reactions, for example the combustion of liquid fuel in air for the production of power.

The method according to the invention comprises establishing opposed flows of the fluid to be dispersed (hereinafter referred to as the first fluid) and of a second fluid (which may be the same as or different from a third fluid into which the first fluid is to be dispersed) along a confined path having a number of exits to the third fluid distributed along its length, and adjusting one of the flows in relation to the other flow so that the first fluid leaves the path through a desired number of the exits and the second fluid leaves the path through the remaining exits, if any.

The invention also includes apparatus for carrying out the method comprising a conduit having two entries for fluid spaced apart along the conduit and a number of exits distributed along the conduit between the entries, and means for controlling flow of fluid into the conduit through one of the entries.

For use in the case in which the second and third fluids are the same and the third fluid is in the form of a fast moving stream, the entry for the second fluid in the apparatus referred to in the preceding paragraph may be an opening and the exits are either exit openings, or branches which terminate in exit openings, the facing directions of the exit openings being displaced not substantially less than 90° from the facing direction of the entry opening. In use the apparatus is located in the moving stream with the entry opening facing the oncoming fluid so that velocity head pressure is generated at the said entry opening. Preferably the flow controlling means is arranged to control the flow of the first fluid into the other entry.

The invention is illustrated by the accompanying drawing in which.

Figure 1:
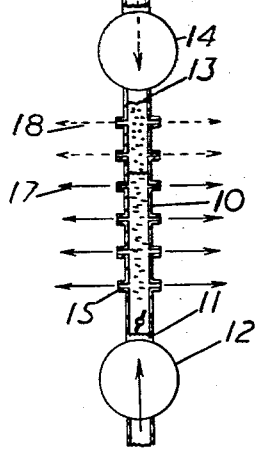
FIGURE 1 shows diagrammatically the principle of the invention.

In FIGURE 1 a conduit 10 has an entry 11 at one end for the first fluid, supplied by any convenient flow producing means represented conventionally as a pump 12, and an entry 13 at the other end for the second fluid, also supplied by any convenient flow producing means represented as a pump 14. The conduit 10 has a number of exists 15 to a third fluid surrounding the conduit, the exists being distributed along the conduit between the entries, and a valve 16 is provided for controlling flow of the first fluid through the entry 11. Obviously however the valve could equally well be arranged to control the flow of the second fluid through the entry 13, or there could be two valves.

In use the valve 16 is adjusted so that first fluid issues through a desired number of exists 15, as indicated by the full line arrows 17, and second fluid issues through the remaining exits as indicated by the dotted line arrows 18. Obviously there are two extreme conditions in which first fluid and second fluid respectively issue through all the exits. In the second of these conditions the valve 16 will, or can be, closed to prevent second fluid penetrating to the source of the first fluid, and in the first, if penetration of the first fluid to the source of the second fluid is objectionable, the maximum flow of first fluid may be limited so that such penetration is not possible.

The apparatus may for example be used for dispersing liquid fuel into an afterburner attached to a turbojet engine, the conduit 10 being arranged in the engine efflux duct the entry 11 being connected to a fuel supply system and the entry 13 to an air bleed connection on the air compressor of the engine. In this case the valve 16 would normally be incorporated in the fuel supply system. During operation without afterburning, air issues through the exits 15. With a small flow of afterburner fuel, such fuel issues through only some of the exists 15 and is thus mixed with part only of the engine efflux in proportions to provide a readily ignitable mixture. As the fuel flow is increased progressively, more exits come progressively into use and the fuel is dispersed over a larger cross sectional area of the duct.

The apparatus could also be used in a combustion system for the purpose of progressively changing over from one fuel to another, the two fuel supplies being connected to the two entries 11 and 13.

Figure 2:
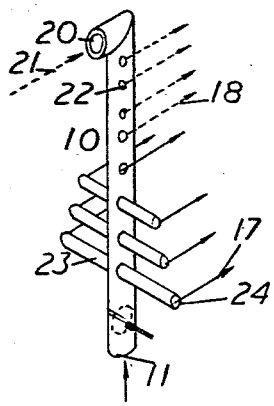
FIGURE 2 shows in perspective a first example of an apparatus of the kind defined in the fourth paragraph of this specification.

FIGURE 2 shows a modification of the apparatus suitable for dispersing a first fluid, for example liquid fuel, into a third fluid which is in the form of a fast moving stream, for example of air or of turbojet engine efflux. In this case the second fluid entry is in the form of an opening 20 which can be arranged to face the oncoming third fluid indicated by arrow 21 so that velocity head pressure is generated in it. Some of the exits are in the form of exit openings 22 and others are in the form of branch conduits 23 having exit openings 24 at their ends, but all the exit openings have facing directions displaced not substantially less than 90° from the facing direction of the entry opening 20 so that they shall not pick up a velocity head pressure in excess of that picked up by the entry 20. In use, the valve 16, which may be located elsewhere in the first fluid supply system, is adjusted so that first fluid issues through a desired number of the exit openings, as indicated by full line arrows 17, and second fluid (which is the same as the third fluid) issues through the remaining exit openings as indicated by the dotted line arrows 18.

Figure 3:
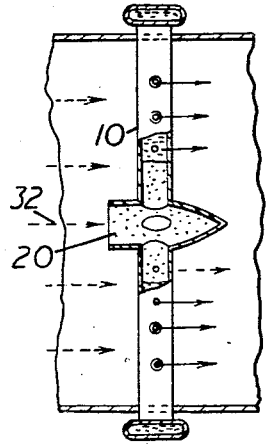
FIGURE 3 is an axial section through a duct containing a second example of an apparatus according to the invention.
Figure 4:
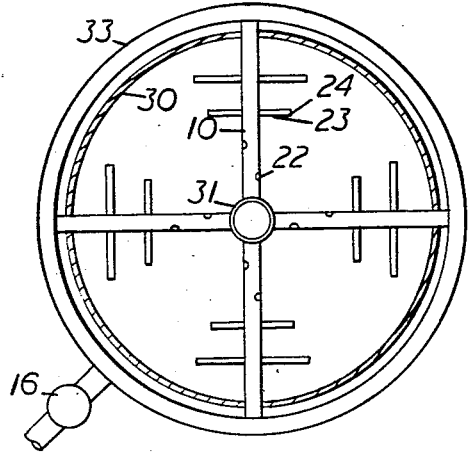
FIGURE 4 is a view looking in the flow direction along the duct of FIGURE 3.

As shown in FIGURES 3 and 4 a number of conduits 10 may have a common forwardly facing entry opening 20. In this example four conduits 10 are arranged radially in a duct 30, extending from a central cup 31 having an entry opening 20 facing the oncoming third fluid indicated by the arrows 32. At their outer entry ends the conduits 10 are connected to a manifold 33 to which first fluid is supplied through a supply system including a flow control valve 16. Each conduit 10 is provided with exit openings 22 distributed along a radially inner part of its length and with branch conduits 23 distributed along a radially outer part of its length, the branch conduits terminating in exit openings 24. The apparatus is operated in the manner described in connection with FIGURE 2, so that for low flow values of the first fluid it is dispersed only into an outer annulus of the cross section of the duct, and as the flow is increased the width of the annulus increases inwardly.

Figure 5:
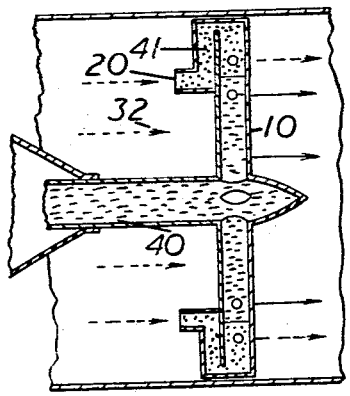
FIGURES 5 and 6 are similar views of a third example.
Figure 6:
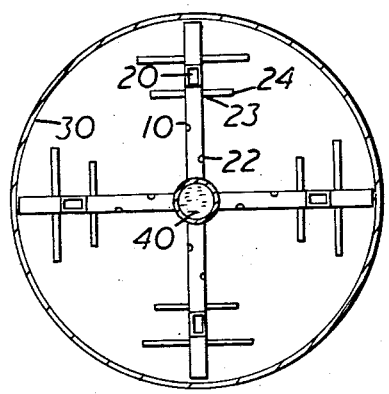

In an alternative arrangement shown in FIGURES 5 and 6 there is a single first fluid entry 40 at the centre of the system of conduits 10, each conduit having connected to its outer end, an inlet 20 for second fluid tapped off from the third fluid flowing in the duct 30. The inlets 20 are spaced inwardly from the wall of the duct, so as to be out of the boundary layer adjacent the wall, and are connected to the outer ends of the conduits 10 by passages 41.

The forms of the apparatus illustrated by FIGURES 2 to 6 are particularly suitable for dispersing fuel into the air stream flowing through a ramjet engine.

We claim:

1. A method of dispersing separate streams of first and second fluids in controllable ratio into a third fluid, comprising establishing a relative flow of the first and second fluids towards one another along a confined path having a number of exits to the third fluid distributed along its length, the physical characteristics of the path being related to the physical characteristics of the first and second fluids and to the environmental force field so that each fluid extends across the entire cross section of the confined path and the fluids meet at a common boundary without substantial mixing, and adjusting the position of the common boundary along the path by changing the relative flow of the first and second fluids so that the first fluid leaves the path through a desired number of exits on one side of the boundary and the second fluid leaves the path through the remaining exits, if any, on the other side of the boundary.

2. A method according to claim 1, in which the third fluid is a moving stream and one of the opposed flows is divided off from the said stream.

3. Apparatus for dispersing separate streams of a first fluid into a moving stream of a different fluid, comprising a duct for conveying the moving stream of fluid, a conduit mounted transversely within the duct, a first entry for admitting the first fluid into the conduit, a second entry spaced apart from the first entry along the conduit and facing in the upstream direction of the moving stream of fluid so that a portion of the moving stream is divided off from the main stream flowing through the duct and is led into the conduit, a number of exits distributed along the conduit between the first and second entries, and means for controlling the supply of first fluid to the first entry so that the first fluid leaves the conduit through a desired number of exits and the portion of fluid led from the second entry into the conduit leaves the conduit through the remaining exits, if any.

4. Apparatus according to claim 3 in which a number of conduits are arranged radially in the duct, and are provided at their outer ends with entries for the first fluid.

5. Apparatus according to claim 3 in which a number of conduits are arranged radially in the duct, extending from a central point at which there is a common entry for the first fluid.

6. Apparatus according to claim 3 including means for controlling the supply of the first fluid to the first entry.

7. Apparatus according to claim 3 in which the conduit or conduits is or are arranged in a duct for conveyance of a stream of combustion-supporting gas constituting the said third fluid, and means are provided for supplying liquid fuel constituting the said first fluid to one of the entries of each conduit.

References Cited in the file of this patent

UNITED STATES PATENTS

| 2,979,899 | Salmon et al. | Apr. 18, 1961 |
| 3,043,101 | Lefebvre | July 10, 1962 |